(12) United States Patent
Wittkopp et al.

(10) Patent No.: US 8,226,521 B2
(45) Date of Patent: Jul. 24, 2012

(54) EIGHT SPEED AUTOMATIC TRANSMISSION

(75) Inventors: Scott H. Wittkopp, Ypsilanti, MI (US);
James M. Hart, Belleville, MI (US);
Andrew W. Phillips, Saline, MI (US);
Clinton E. Carey, Monroe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/158,890

(22) Filed: Jun. 13, 2011

(65) Prior Publication Data

US 2011/0245016 A1 Oct. 6, 2011

Related U.S. Application Data

(62) Division of application No. 12/051,025, filed on Mar. 19, 2008, now Pat. No. 7,976,425.

(51) Int. Cl.
*F16H 3/44* (2006.01)
(52) U.S. Cl. .......................... 475/284; 475/288
(58) Field of Classification Search .................. 475/271, 475/275–291, 296, 330
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,364,527 B2* | 4/2008 | Klemen | 475/290 |
| 7,524,259 B2* | 4/2009 | Raghavan | 475/286 |
| 7,575,532 B2 | 8/2009 | Raghavan et al. | |
| 7,824,300 B2 | 11/2010 | Wittkopp et al. | |
| 2004/0248694 A1* | 12/2004 | Ishimaru | 475/275 |
| 2005/0090362 A1 | 4/2005 | Abe et al. | |
| 2006/0270513 A1 | 11/2006 | Klemen | |
| 2006/0270516 A1 | 11/2006 | Klemen | |
| 2007/0207891 A1* | 9/2007 | Gumpoltsberger | 475/280 |
| 2008/0015080 A1 | 1/2008 | Kamm et al. | |
| 2008/0234093 A1 | 9/2008 | Diosi et al. | |
| 2008/0242494 A1 | 10/2008 | Wittkopp | |
| 2010/0203997 A1 | 8/2010 | Baldwin | |
| 2010/0227731 A1* | 9/2010 | Shim | 475/276 |

* cited by examiner

*Primary Examiner* — Roger Pang

(57) ABSTRACT

An automatic transmission is provided having an input member, an output member, four planetary gear sets, a plurality of coupling members and a plurality of torque transmitting devices. Each of the planetary gear sets includes first, second and third members. The torque transmitting devices may be either clutches or brakes. The torque transmitting devices are selectively engageable in combinations of at least two to establish at least eight forward speed ratios and at least one reverse speed ratio between the input member and the output member.

15 Claims, 3 Drawing Sheets

| GEAR STATE | GEAR RATIO | RATIO STEP | TORQUE TRANSMITTING DEVICES ||||| 
|---|---|---|---|---|---|---|---|
| | | | 32 | 34 | 36 | 26 | 28 |
| REV | -3.432 | | X | | X | | |
| N | | -0.77 | O | | O | | |
| 1ST | 4.467 | | X | | | | X |
| 2ND | 3.000 | 1.49 | X | X | | | |
| 3RD | 2.333 | 1.29 | | X | | | X |
| 4TH | 1.620 | 1.44 | | X | X | | |
| 5TH | 1.440 | 1.13 | | X | | X | |
| 6TH | 1.157 | 1.24 | | | X | X | |
| 7TH | 1.000 | 1.16 | | | | X | X |
| 8TH | 0.783 | 1.28 | | | X | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING DEVICES ||||| 
|---|---|---|---|---|---|---|---|
| | | | 132 | 134 | 136 | 128 | 126 |
| REV | -2.739 | | | X | | | X |
| N | | -0.59 | | O | | | O |
| 1ST | 4.606 | | | X | X | | |
| 2ND | 3.150 | 1.46 | X | X | | | |
| 3RD | 2.604 | 1.21 | X | | X | | |
| 4TH | 1.744 | 1.49 | X | | | | X |
| 5TH | 1.450 | 1.20 | X | | | X | |
| 6TH | 1.000 | 1.45 | | | | X | X |
| 7TH | 0.869 | 1.15 | | | X | X | |
| 8TH | 0.677 | 1.28 | | | X | | X |

X = ON - ENGAGED CARRYING TORQUE
O = ON - ENGAGED NOT CARRYING TORQUE

EIGHT SPEED AUTOMATIC TRANSMISSION

CROSS-REFERENCE TO RELATED APPLICATIONS

This application claims the benefit of U.S. application Ser. No. 12/051,025 filed on Mar. 19, 2008 and U.S. Provisional Application No. 60/908,814 filed on Mar. 29, 2007. The disclosures of the above applications are incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting devices.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

An automatic transmission is provided having an input member, an output member, four planetary gear sets, a plurality of coupling members and a plurality of torque transmitting devices. Each of the planetary gear sets includes first, second and third members. A first interconnecting member continuously interconnects the first member of the first planetary gear set with first member of the third planetary gear set. A second interconnecting member continuously interconnects the second member of the first planetary gear set with second member of the second planetary gear set. A third interconnecting member continuously interconnects the first member of the second planetary gear set with the first member of the third planetary gear set. A fourth interconnecting member continuously interconnects the third member of the second planetary gear set with the third member of the fourth planetary gear set. A fifth interconnecting member continuously interconnects the second member of the third planetary gear set with the second member of the fourth planetary gear set. Five torque transmitting devices are selectively engageable to interconnect one of the first members, second members, and third members with at least one other of the first members, second members, third members, and the stationary member. The torque transmitting devices are selectively engageable in combinations of at least two to establish at least eight forward speed ratios and at least one reverse speed ratio between the input member and the output member.

In another aspect of the present invention, a first of the five torque transmitting devices is selectively engageable to interconnect the third member of the first planetary gear set with the second member of the third planetary gear set.

In another aspect of the present invention, a second of the five torque transmitting devices is selectively engageable to interconnect at least one of the first member of the fourth planetary gear set and the output member with the first member of the second planetary gear set.

In another aspect of the present invention, a third of the five torque transmitting devices is selectively engageable to interconnect the third member of the first planetary gear set with the stationary member.

In another aspect of the present invention, a fourth of the five torque transmitting devices is selectively engageable to interconnect at least one of the second member of the first planetary gear and the second member of the second planetary gear with the stationary member.

In another aspect of the present invention, a fifth of the five torque transmitting devices is selectively engageable to interconnect the third member of the third planetary gear set with the stationary member.

In another aspect of the present invention, the input member is continuously interconnected with at least one of the second member of the third planetary gear set and the second member of the fourth planetary gear set and the output member is continuously interconnected with the first member of the fourth planetary gear set.

In another aspect of the present invention, the stationary member is a transmission housing.

In another aspect of the present invention, an automatic transmission is provided having an input member, an output member, four planetary gear sets, a plurality of coupling members and a plurality of torque transmitting devices. Each of the planetary gear sets includes first, second and third members. The input member is continuously interconnected to at least one of the carrier member of the third planetary gear set and the sun gear of the fourth planetary gear set and the output member is continuously interconnected with the carrier member of the fourth planetary gear set. A first interconnecting member continuously interconnects the ring gear of the first planetary gear set with ring gear of the third planetary gear set. A second interconnecting member continuously interconnects the sun gear of the first planetary gear set with the ring gear of the second planetary gear set. A third interconnecting member continuously interconnects the sun gear of the second planetary gear set with the ring gear of the third planetary gear set. A fourth interconnecting member continuously interconnects the carrier member of the second planetary gear set with the ring gear of the fourth planetary gear set. A fifth interconnecting member continuously interconnects the carrier member of the third planetary gear set with the sun gear of the fourth planetary gear set. A first torque transmitting device is selectively engageable to interconnect the carrier member of the first planetary gear set with the carrier member of the third planetary gear set. A second torque transmitting device is selectively engageable to interconnect at least one of the carrier member of the fourth planetary gear set and the output member with the sun gear of the second planetary gear set. A third torque transmitting device is selectively engageable to interconnect the carrier member of the first planetary gear set with the stationary member. A fourth torque transmitting device is selectively engageable to interconnect at least one of the sun gear member of the first planetary gear and the ring gear of the second planetary gear with the stationary member. A fifth torque transmitting device is selectively engageable to interconnect the sun gear of the third planetary gear set with the stationary member. The torque transmitting devices are selectively engageable in combinations of at least two to establish at least eight forward speed ratios and at least one reverse speed ratio between the input member and the output member.

In another aspect of the present invention, an automatic transmission is provided having an input member, an output member, four planetary gear sets, a plurality of coupling members and a plurality of torque transmitting devices. Each of the planetary gear sets includes first, second and third members. The input member is continuously interconnected with the sun gear of the fourth planetary gear set and the output member is continuously interconnected with at least one of the ring gear of the third planetary gear set and the carrier member of the fourth planetary gear set. A first interconnecting member continuously interconnects the ring gear of the first planetary gear set with carrier member of the second planetary gear set. A second interconnecting member continuously interconnects the carrier member of the first planetary gear set with the ring gear of the second planetary gear set. A third interconnecting member continuously interconnects the sun gear of the second planetary gear set with the ring gear of the fourth planetary gear set. A fourth interconnecting member continuously interconnects the carrier member of the second planetary gear set with the carrier member of the third planetary gear set. A fifth interconnecting member continuously interconnects the ring gear of the third planetary gear set with the carrier member of the fourth planetary gear set. A first torque transmitting device is selectively engageable to interconnect at least one of the carrier member of the second planetary gear set and the ring gear of the first planetary gear set with at least one of the input member and the sun gear of the fourth planetary gear set. A second torque transmitting device is selectively engageable to interconnect the carrier member of the first planetary gear set with at least one of the sun gear of the fourth planetary gear set and the input member. A third torque transmitting device is selectively engageable to interconnect the sun gear of the first planetary gear set with the stationary member. A fourth torque transmitting device is selectively engageable to interconnect at least one of the carrier member of the first planetary gear and the ring gear of the second planetary gear set with the stationary member. A fifth torque transmitting device is selectively engageable to interconnect the sun gear of the third planetary gear set with the stationary member. The torque transmitting devices are selectively engageable in combinations of at least two to establish at least eight forward speed ratios and at least one reverse speed ratio between the input member and the output member.

Further aspects, objects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the members of the four planetary gear sets. These permanent mechanical connections relate the transmission embodiments. More specifically, a first component or member of a first planetary gear set is permanently coupled to a first component or member of a second planetary gear set. A second component or member of the first planetary gear set is permanently coupled to a second component or member of a second planetary gear set. A first component or member of the second planetary gear set is permanently coupled to a first component or member of a third planetary gear set. A third component or member of the second planetary gear set is permanently coupled to a third component or member of a fourth planetary gear set. Finally, a second component or member of the third planetary gear set is permanently coupled to a second component or member of the fourth planetary gear set.

Figure 1:
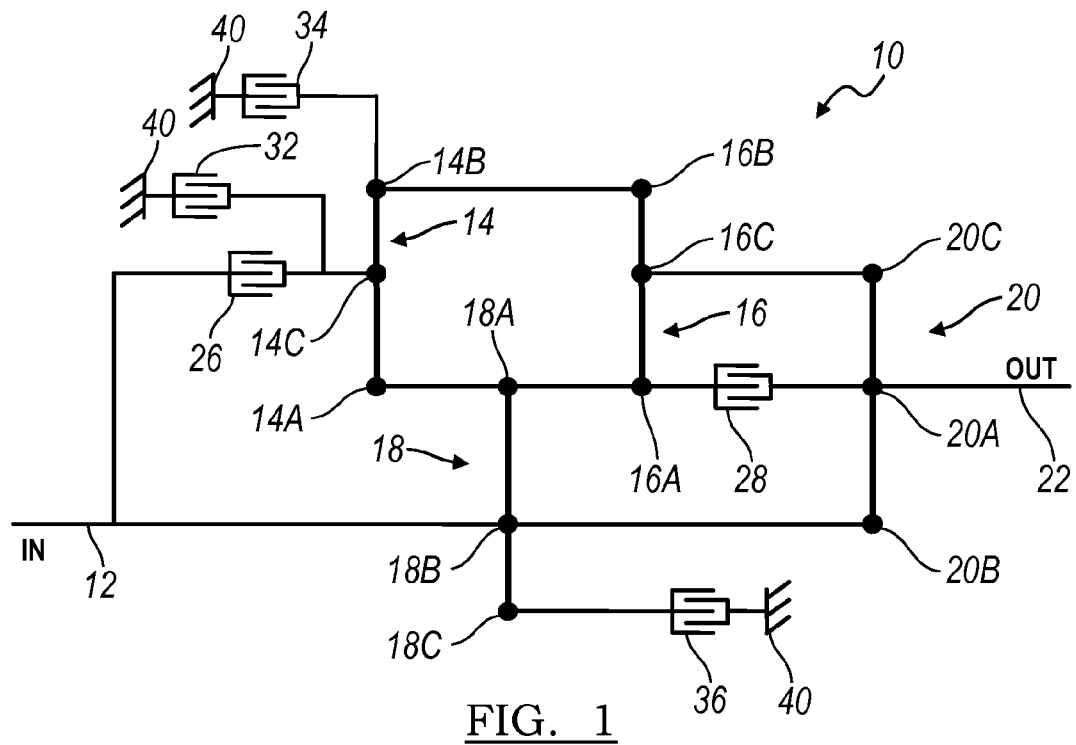
FIG. 1 is a lever diagram of a first embodiment of an eight speed automatic transmission according to the present invention.

Referring now to FIG. 1, a first embodiment of an eight speed automatic transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gearset. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, which is hereby fully incorporated by reference.

The automatic transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22. The first node 14A of the first planetary gear set 14 is coupled to a first node 16A of the second planetary gear set 16. The first node 16A of the second planetary gear set 16 is also coupled to the first node 18A of the third planetary gear set 18. The second node 14B of the first planetary gear set 14 is coupled to the second node 16B of the second planetary gear set 16. The third node 16C of the second planetary gear set 16 is coupled to the third node 20C of the fourth planetary gear set 20. The second node 18B of the third planetary gear set 18 is coupled to the second node 20B of the fourth planetary gear set 20.

The input shaft or member 12 is coupled to the second node 18B of the third planetary gear set 18 and the second node 20B of the fourth planetary gear set 20. The output shaft or member 22 is coupled to the first node 20A of the fourth planetary gear set 20. A first clutch 26 selectively connects the input shaft or member 12 to the third node 14C of the first planetary gear set 14 and a first brake 32 selectively connects the third node 14C of the first planetary gear set 14 to ground or transmission housing 40. A second clutch 28 selectively connects the first node 16A of the second planetary gear set 16 to the first node 20A of the fourth planetary gear set 20. A second brake 34 selectively connects the second node 14B of the first planetary gear set 14 to ground or transmission housing 40 and a third brake 36 selectively connects the third node 18C of the third planetary gear set 18 to ground or transmission housing 40.

Figure 2:
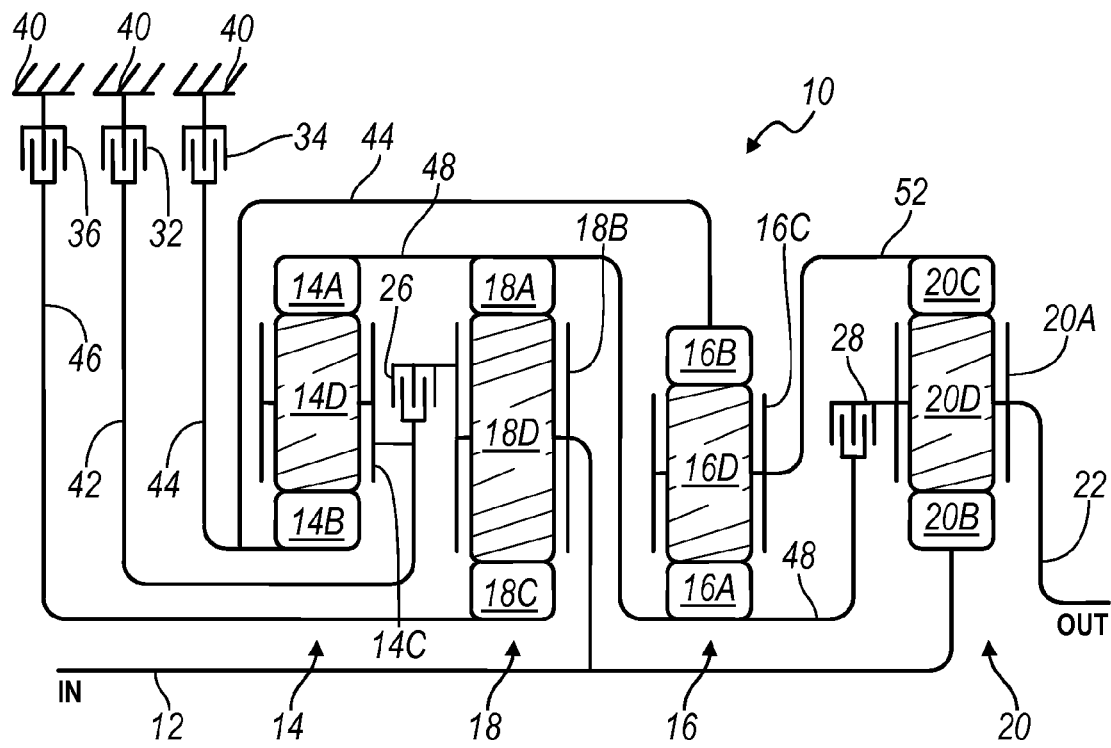
FIG. 2 is a diagrammatic view of a first embodiment of an eight speed automatic transmission according to the present invention.

Referring now to FIG. 2, a stick diagram presents a schematic layout of the first embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such a sun gears, ring gears, planet gears and planet gear carriers. The transmission 10 includes the input shaft or member 12 which is coupled to and directly drives a third planet carrier 18B of the third planetary gear set 18. The third planet carrier 18B includes a plurality of planet gears 18D rotatably disposed thereon. Each of the planet pinions of the plurality of planet gears 18D mesh with both the sun gear 18C and the ring gear 18A. The input shaft or member 12 also is coupled to and directly drives a fourth sun gear 20B of the fourth planetary gear set 20. The output shaft or member 22 is coupled to and driven by a planet gear carrier 20A which includes a plurality of planet gears 20D rotatably disposed thereon. Each of the planet pinions of plurality of planet gears 20D mesh with both the sun gear 20B and the ring gear 20C.

A first shaft or interconnecting member 42 couples the first brake 32 to a first planet gear carrier 14C of the first planetary gear set 14 and the first clutch 26. First brake 32 selectively couples first planet gear carrier 14C of the first planetary gear set 14 to ground or transmission housing 40. The first planet carrier 14C includes a plurality of planet gears 14D rotatably disposed thereon. Each of the planet pinions of plurality of planet gears 14D mesh with both the sun gear 14B and the ring gear 14A. The first clutch 26 selectively interconnects the interconnecting member 42 and the first planet gear carrier 14C with the third planet gear carrier 18B. A second shaft or interconnecting member 44 couples the second brake 34 to a first sun gear 14B of the first planetary gear set 14. The second interconnecting member 44 also couples the first sun gear 14B and the second brake 34 to a second ring gear 16B of the second planetary gear set 16. The second brake 34 selectively couples first sun gear 14B of the first planetary gear set 14 and second ring gear 16B of the second planetary gear set 16 to ground or transmission housing 40. A third shaft or interconnecting member 46 couples the third brake 36 to a third sun gear 18C of the third planetary gear set 18. The third brake 36 selectively couples third sun gear 18C of the third planetary gear set 18 to ground or transmission housing 40. A fourth shaft or interconnecting member 48 interconnects a first ring gear 14A of the first planetary gear set 14, a third ring gear 18A of the third planetary gear set 18, a second sun gear 16A of the second planetary gear set 16 and the second clutch 28. The second clutch 28 selectively interconnects the fourth interconnecting member 48 with the fourth planet carrier 20A of the fourth planetary gear set 20 and the output shaft or member 22. Finally, a fifth shaft or interconnecting member 52 couples the second planet carrier 16C of the second planetary gear set 16 to a fourth ring gear 20C of the fourth planetary gear set 20. The second planet carrier 16C includes a plurality of planet gears 16D rotatably disposed thereon. Each of the planet pinions of plurality of planet gears 16D mesh with both the sun gear 16A and the ring gear 16B.

Figures 3, 4:
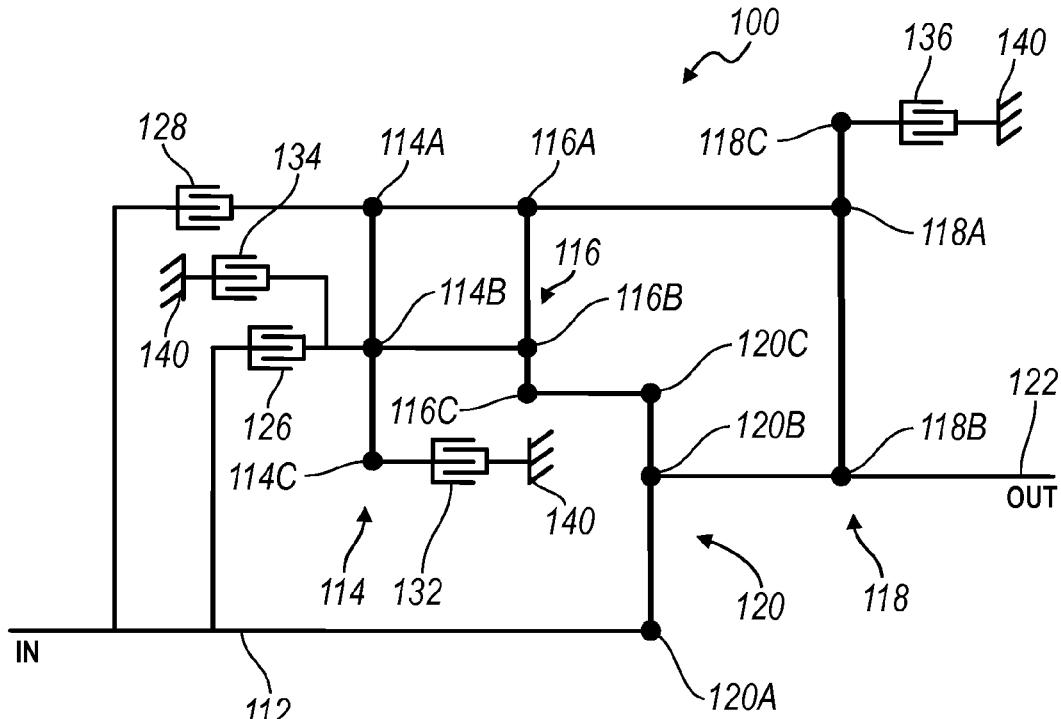
FIG. 3 is a truth table presenting the state of engagement of the various torque transmitting clutches and brakes in each of the available forward and reverse speeds or gear ratios of the automatic transmission illustrated in FIGS. 1 and 2.
FIG. 4 is a lever diagram of a second embodiment of an eight speed automatic transmission according to the present invention.

Referring now to FIGS. 2 and 3, the operation of the first embodiment of the eight speed automatic transmission 10 will be described. It will be appreciated that the automatic transmission 10 is capable of transmitting torque from the input shaft or member 12 to the output shaft or member 22 in eight forward speed or torque ratios and one reverse speed or torque ratio. Each forward and reverse speed or torque ratio is attained by engagement of one or more of the clutches or brakes as will be explained below. FIG. 3 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10.

To establish reverse gear, the first brake 32 and the third brake 36 are engaged or activated. The first brake 32 grounds the first planet carrier 14C of the first planetary gear set 14 and the third brake 36 grounds the third sun gear 18C of the third planetary gear set 18. Likewise, the eight forward ratios are achieved through different combinations of clutch engagement as per FIG. 3

It will be appreciated that the foregoing explanation of operation and gear states of the eight speed automatic transmission 10 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Turning now to FIG. 4, a lever diagram for a second embodiment of an eight speed automatic transmission 100 is illustrated. The automatic transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122. The first node 114A of the first planetary gear set 114 is coupled to a first node 116A of the second planetary gear set 116. The first node 116A of the second planetary gear set 116 is also coupled to the first node 118A of the third planetary gear set 118. The second node 114B of the first planetary gear set 114 is coupled to the second node 116B of the second planetary gear set 116. The third node 116C of the second planetary gear set 116 is coupled to the third node 120C of the fourth planetary gear set 120. The second node 118B of the third planetary gear set 118 is coupled to the second node 120B of the fourth planetary gear set 120.

The input shaft or member 112 is coupled to the first node 120A of the fourth planetary gear set 120. The output shaft or member 122 is coupled to the second node 118B of the third planetary gear set 118 and the second node 120B of the fourth planetary gear set 120. A first clutch 126 selectively connects the input shaft or member 112 to the second node 114B of the first planetary gear set 114 and a second clutch 128 selectively connects the input shaft or member 112 to the first node 114A of the first planetary gear set 114. A first brake 132 selectively connects the third node 114C of the first planetary gear set 114 to ground or transmission housing 140. A second brake 134 selectively connects the second node 114B of the first planetary gear set 114 to ground or transmission housing 140 and a third brake 136 selectively connects the third node 118C of the third planetary gear set 118 to ground or transmission housing 140.

Figures 5, 6:
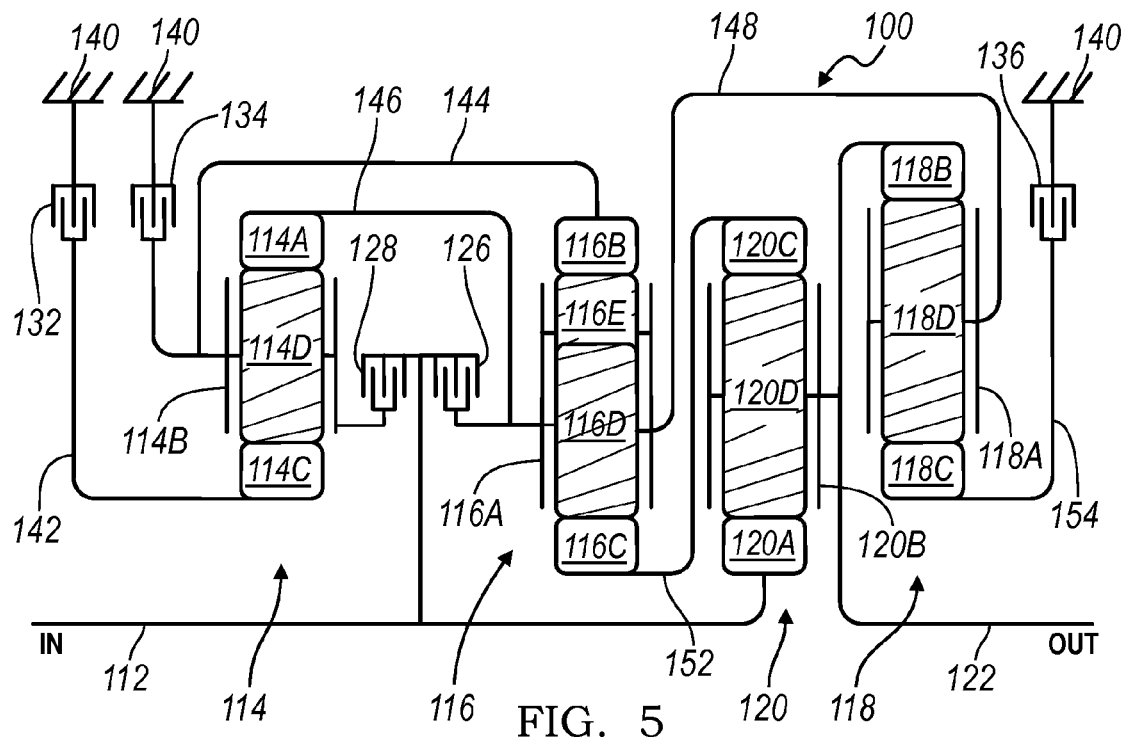
FIG. 5 is a diagrammatic view of a second embodiment of an eight speed automatic transmission according to the present invention.
FIG. 6 is a truth table presenting the state of engagement of the various torque transmitting clutches and brakes in each of the available forward and reverse speeds or gear ratios of the automatic transmission illustrated in FIGS. 4 and 5.

Referring now to FIG. 5, a stick diagram presents a schematic layout of the second embodiment of the eight speed transmission 100 according to the present invention. In FIG. 5, the numbering from the lever diagram of FIG. 4 is carried over. The clutches, brakes and couplings are correspondingly presented whereas the nodes of the planetary gear sets now appear as components of planetary gear sets such a sun gears, ring gears, planet gears and planet gear carriers.

The transmission 100 includes the input shaft or member 112 which is coupled to and directly drives a fourth sun gear 120A of the fourth planetary gear set 120. Also coupled to and driven by the input shaft or member 112 are a first clutch 126 and a second clutch 128. The first clutch 126 selectively interconnects the input shaft or member 112 with a second planet carrier 116A of the second planetary gear set 116. The second planet carrier 116A includes a first plurality of pairs of planet gears 116D and a second plurality of pairs of planet gears 116E which are rotatably disposed thereon. The first plurality of pairs of planet gears 116D mesh with both the sun gear 116C and the second plurality of pairs of planet gears 116E. The second plurality of pairs of planet gears 116E mesh with both the first plurality of pairs of planet gears 116D the ring gear 116B. The second clutch 128 selectively interconnects the input shaft or member 112 with a first planet carrier 114B of the first planetary gear set 114. The first planet carrier 114B includes a plurality of planet gears 114D which are rotatably disposed thereon. Each of the planet pinions of the plurality of planet gears 114D mesh with both the sun gear 114C and the ring gear 114A. The output shaft or member 122 is coupled to and is driven by a third ring gear 118B of the third planetary gear set 118 and a fourth planet carrier 120B. The fourth planet carrier 120B includes a plurality of planet gears 120D which are rotatably disposed thereon. Each of the planet pinions of the plurality of planet gears 120D mesh with both the sun gear 120A and the ring gear 120C.

A first shaft or interconnecting member 142 couples the first brake 132 to a first sun gear 114C of the first planetary gear set 114. The first brake 132 selectively couples first sun gear 114C of the first planetary gear set 114 to ground or transmission housing 140. A second shaft or interconnecting member 144 couples the second brake 134 to the first planet carrier 114B of the first planetary gear set 114 and a second ring gear 116B of the second planetary gear set 116. The second brake 134 selectively couples the first planet carrier 114B of the first planetary gear set 114 and a second ring gear 116B of the second planetary gear set 116 to ground or transmission housing 140. A third shaft or interconnecting member 146 couples a first ring gear 114A of the first planetary gear set 114 to the first clutch 126 and the second planet carrier 116A of the second planetary gear set 116. A fourth shaft or interconnecting member 148 couples the second planet carrier 116A of the second planetary gear set 116 to a third planet carrier 118A of the third planetary gear set 118. The third planet carrier 118 includes a plurality of planet gears 118D rotatably disposed thereon. Each of the planet pinions of the plurality of planet gears 118D mesh with both the sun gear 118C and the ring gear 118B. A fifth shaft or interconnecting member 152 couples a second sun gear 116C of the second planetary gear set 116 to a fourth ring gear 120C of the fourth planetary gear set 120. Finally, a sixth shaft or interconnecting member 154 couples a third sun gear 118C to the second brake 136. The third brake 136 selectively couples third sun gear 118C of the third planetary gear set 118 to ground or transmission housing 140.

Referring now to FIGS. 5 and 6, the operation of the second embodiment of the eight speed automatic transmission 100 will be described. It will be appreciated that the automatic transmission 100 is capable of transmitting torque from the input shaft or member 112 to the output shaft or member 122 in eight forward speed or torque ratios and one reverse speed or torque ratio. Each forward and reverse speed or torque ratio is attained by engagement of one or more of the clutches or brakes as will be explained below. FIG. 6 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 100.

To establish reverse gear, the second brake 134 and the first clutch 126 are activated or engaged. The second brake 134 grounds the first carrier 114B of the first planetary gear set 114 and the second ring gear 116B of the second planetary gear set 116. The first clutch 126 interconnects the input shaft or member 112 with the second planet carrier 116A of the second planetary gear set 116. Likewise, the eight forward ratios are achieved through different combinations of clutch engagement as per FIG. 6.

It will be appreciated that the foregoing explanation of operation and gear states of the eight speed automatic transmission 100 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members, and wherein the input member is continuously interconnected with the first member of the fourth planetary gear set and the output member is continuously interconnected with the second member of the third planetary gear set and the second member of the fourth planetary gear set;

five interconnecting members each continuously interconnecting one of the first, second and third members of one of the planetary gear sets with one of the first, second and third members of another of the planetary gear sets; and a first torque transmitting device selectively engageable to interconnect at least one of the first member of the first planetary gear set and the first member of the second planetary gear set with the first member of the fourth planetary gear set;

a second torque transmitting device selectively engageable to interconnect the second member of the first planetary gear set with the first member of the fourth planetary gear set;

a third torque transmitting device selectively engageable to interconnect the third member of the first planetary gear set with a stationary member;

a fourth torque transmitting device is selectively engageable to interconnect at least one of the second member of the first planetary gear set and the second member of the second planetary gear with the stationary member, and a fifth torque transmitting device selectively engageable to interconnect the third member of the third planetary gear set with the stationary member; and wherein the torque transmitting devices are selectively engageable in combinations of at least two to establish at least eight forward speed ratios and at least one reverse speed ratio between the input member and the output member.

2. The transmission of claim 1 wherein a first of the five interconnecting members continuously interconnects the first member of the first planetary gear set with the first member of the second planetary gear set.

3. The transmission of claim 2 wherein a second of the five interconnecting members continuously interconnects the second member of the first planetary gear set with the second member of the second planetary gear set.

4. The transmission of claim 3 wherein a third of the five interconnecting members continuously interconnects the first member of the second planetary gear set with the first member of the third planetary gear set.

5. The transmission of claim 4 wherein a fourth of the five interconnecting members continuously interconnects the third member of the second planetary gear set with the third member of the fourth planetary gear set.

6. The transmission of claim 5 wherein a fifth of the five interconnecting members continuously interconnects the second member of the third planetary gear set with the second member of the fourth planetary gear set.

7. The transmission of claim 1 wherein the third members of the first, second and third planetary gear sets and the first member of the fourth planetary gear set are sun gears, the second member of the first and fourth planetary gear sets, the first members of the second and third planetary gear sets are carrier members, and the first member of the first planetary gear set, the second members of the second and third planetary gear sets and the third member of the fourth planetary gear set are ring gears.

8. The transmission of claim 1 wherein the stationary member is a transmission housing.

9. A transmission comprising:
an input member;
an output member;
first, second, third and fourth planetary gear sets each having first, second and third members;

a first interconnecting member continuously interconnecting the first member of the first planetary gear set with first member of the second planetary gear set;

a second interconnecting member continuously interconnecting the second member of the first planetary gear set with second member of the second planetary gear set;

a third interconnecting member continuously interconnecting the first member of the second planetary gear set with the first member of the third planetary gear set;

a fourth interconnecting member continuously interconnecting the third member of the second planetary gear set with the third member of the fourth planetary gear set;

a fifth interconnecting member continuously interconnecting the second member of the third planetary gear set with the second member of the fourth planetary gear set; and a first torque transmitting device selectively engageable to interconnect at least one of the first member of the first planetary gear set and the first member of the second planetary gear set with the first member of the fourth planetary gear set;

a second torque transmitting device selectively engageable to interconnect the second member of the first planetary gear set with the first member of the fourth planetary gear set;

a third torque transmitting device selectively engageable to interconnect the third member of the first planetary gear set with a stationary member;

a fourth torque transmitting device selectively engageable to interconnect at least one of the second member of the first planetary gear set and the second member of the second planetary gear with the stationary member, and a fifth torque transmitting device selectively engageable to interconnect the third member of the third planetary gear set with the stationary member; and wherein the torque transmitting devices are selectively engageable in combinations of at least two to establish at least eight forward speed ratios and at least one reverse speed ratio between the input member and the output member.

10. The transmission of claim 9 wherein the third members of the first, second and third planetary gear sets and the first member of the fourth planetary gear set are sun gears, the second member of the first and fourth planetary gear sets, the first members of the second and third planetary gear sets are carrier members, and the first member of the first planetary gear set, the second members of the second and third planetary gear sets and the third member of the fourth planetary gear set are ring gears.

11. The transmission of claim 9 wherein the input member is continuously interconnected with the first member of the fourth planetary gear set and the output member is continuously interconnected with at least one of the second member of the third planetary gear set and the second member of the fourth planetary gear set.

12. The transmission of claim 9 wherein the stationary member is a transmission housing.

13. A transmission comprising:
an input member;
an output member;
first, second, third and fourth planetary gear sets each having a sun gear, a carrier member, and a ring gear;

a first interconnecting member continuously interconnecting the ring gear of the first planetary gear set with carrier member of the second planetary gear set;

a second interconnecting member continuously interconnecting the carrier member of the first planetary gear set with the ring gear of the second planetary gear set;

a third interconnecting member continuously interconnecting the carrier member of the second planetary gear set with the carrier member of the third planetary gear set;

a fourth interconnecting member continuously interconnecting the sun gear of the second planetary gear set with the ring gear of the fourth planetary gear set;

a fifth interconnecting member continuously interconnecting the ring gear of the third planetary gear set with the carrier member of the fourth planetary gear set;

a first torque transmitting device selectively engageable to interconnect at least one of the ring gear of the first planetary gear set and the carrier member of the second planetary gear set with the sun gear of the fourth planetary gear set;

a second torque transmitting device selectively engageable to interconnect the carrier member of the first planetary gear set with the sun gear of the fourth planetary gear set;

a third torque transmitting device selectively engageable to interconnect the sun gear of the first planetary gear set with a stationary member;

a fourth torque transmitting device selectively engageable to interconnect at least one of the carrier member of the first planetary gear and the ring gear of the second planetary gear set with the stationary member; and a fifth torque transmitting device selectively engageable to interconnect the sun gear of the third planetary gear set with the stationary member, and wherein the torque transmitting devices are selectively engageable in combinations of at least two to establish at least eight forward speed ratios and at least one reverse speed ratio between the input member and the output member.

14. The transmission of claim 13 wherein the input member is continuously interconnected with the sun gear of the fourth planetary gear set and the output member is continuously interconnected with at least one of the ring gear of the third planetary gear set and the carrier member of the fourth planetary gear set.

15. The transmission of claim 13 wherein the stationary member is a transmission housing.

* * * * *